US011019862B1

(12) United States Patent
McBryan et al.

(10) Patent No.: US 11,019,862 B1
(45) Date of Patent: Jun. 1, 2021

(54) GRASP ASSIST SYSTEM WITH TRIPLE BRUMMEL SOFT ANCHOR

(71) Applicant: United States of America as represented by the Administrator of the National Aeronautics and Space Administration, Washington, DC (US)

(72) Inventors: Emily R. McBryan, Houston, TX (US); Jonathan M. Rogers, League City, TX (US); Benjamin J. Peters, Houston, TX (US); Evan Laske, Houston, TX (US)

(73) Assignee: United States of America as represented by the Administrator of the National Aeronautics and Space Administration, Washington, DC (US)

(*) Notice: Subject to any disclaimer, the term of this patent is extended or adjusted under 35 U.S.C. 154(b) by 196 days.

(21) Appl. No.: 15/946,519

(22) Filed: Apr. 5, 2018

Related U.S. Application Data

(60) Provisional application No. 62/529,831, filed on Jul. 7, 2017, provisional application No. 62/482,658, filed on Apr. 6, 2017.

(51) Int. Cl.
*A41D 19/00* (2006.01)
*A41D 19/015* (2006.01)
(Continued)

(52) U.S. Cl.
CPC ..... *A41D 19/0024* (2013.01); *A41D 19/0006* (2013.01); *A41D 19/0044* (2013.01);
(Continued)

(58) Field of Classification Search
CPC ............ A41D 19/0024; A41D 19/0006; A41D 19/0044; A41D 19/015; A41D 2500/50;
(Continued)

(56) References Cited

U.S. PATENT DOCUMENTS 5,631,861 A * 5/1997 Kramer .................. G06F 3/011
  414/5
6,042,555 A * 3/2000 Kramer .................. A61B 5/225
  600/595

(Continued)

FOREIGN PATENT DOCUMENTS

WO  2012165880 A2  12/2012
WO  2015134336 A2   9/2015
WO  2016174091 A1  11/2016

OTHER PUBLICATIONS

"MusicGlove Helps Stroke Patients Use Their Hands Again", The Assistive Technology Daily, May 26, 2015.

(Continued)

*Primary Examiner* — Richale L Quinn
(74) *Attorney, Agent, or Firm* — Kurt G. Hammerle; Edward K. Fein

(57) ABSTRACT

A grasp assist system includes a glove, finger saddles attached to a respective glove finger, one or more tendon actuators, and artificial tendons. The saddles have a rectangular body partially circumscribing a respective glove finger. Each saddle includes end lobes at opposite distal ends of the body. A first end of each tendon is secured to one of the tendon actuators. A second end forms a triple Brummel loop defining a main loop and two anchor loops. The anchor loops are disposed around the lobes. The saddles may form a rounded, double-headed arrow shape that is at least double the thickness of the body. The finger saddles are anisotropic, with different bending strengths depending on the axis, and may be constructed of thermoplastic polyurethane-coated nylon. Flexion and/or contact sensors and a controller, may be used. A method of connecting the tendon actuator to the finger is also disclosed.

5 Claims, 5 Drawing Sheets

(51) Int. Cl.
  *B32B 27/08* (2006.01)
  *B32B 27/36* (2006.01)
  *B32B 25/20* (2006.01)
  *B32B 25/08* (2006.01)
  *B32B 27/32* (2006.01)

(52) U.S. Cl.
  CPC ............ *A41D 19/015* (2013.01); *B32B 25/08* (2013.01); *B32B 25/20* (2013.01); *B32B 27/08* (2013.01); *B32B 27/322* (2013.01); *B32B 27/36* (2013.01); *A41D 2500/50* (2013.01); *A41D 2600/20* (2013.01); *B32B 2307/3065* (2013.01); *B32B 2307/558* (2013.01); *B32B 2307/7265* (2013.01)

(58) Field of Classification Search
  CPC .... A41D 2600/20; B32B 25/08; B32B 25/20; B32B 27/20; B32B 27/322; B32B 27/36; B32B 2307/3065
  See application file for complete search history.

(56) References Cited

U.S. PATENT DOCUMENTS

| | | | | |
|---|---|---|---|---|
| 6,110,130 | A * | 8/2000 | Kramer | A61B 5/1071 600/587 |
| 6,312,398 | B1 | 11/2001 | Cencer | |
| 6,413,229 | B1 | 7/2002 | Kramer et al. | |
| 7,410,338 | B2 | 8/2008 | Schiele et al. | |
| 7,481,782 | B2 | 1/2009 | Scott et al. | |
| 8,029,414 | B2 | 10/2011 | Ingvast et al. | |
| 8,255,079 | B2 | 8/2012 | Linn et al. | |
| 8,276,958 | B2 | 10/2012 | Ihrke et al. | |
| 9,067,325 | B2 | 6/2015 | Ihrke et al. | |
| 9,149,933 | B2 | 10/2015 | Ihrke et al. | |
| 9,387,112 | B2 * | 7/2016 | Bryant | A61F 5/013 |
| 10,723,016 | B2 * | 7/2020 | Cho | B25J 9/1664 |
| 2006/0094989 | A1 * | 5/2006 | Scott | A61F 2/586 601/5 |
| 2009/0137862 | A1 * | 5/2009 | Evans | A61F 2/0045 600/37 |
| 2010/0041521 | A1 * | 2/2010 | Ingvast | B25J 9/0006 482/49 |
| 2011/0071664 | A1 * | 3/2011 | Linn | B25J 13/025 700/213 |
| 2012/0022666 | A1 * | 1/2012 | Brooks | A61F 2/586 623/24 |
| 2012/0059290 | A1 | 3/2012 | Yip | |
| 2013/0219586 | A1 * | 8/2013 | Ihrke | B25J 15/08 2/160 |
| 2013/0226350 | A1 * | 8/2013 | Bergelin | A61H 1/0288 700/275 |
| 2014/0222199 | A1 * | 8/2014 | Ihrke | B25J 15/0009 700/253 |
| 2014/0257382 | A1 * | 9/2014 | McCartney | A61B 17/0485 606/232 |
| 2015/0094636 | A1 | 4/2015 | Miyazawa | |
| 2015/0351739 | A1 * | 12/2015 | Napolitano | A61B 17/0401 606/228 |
| 2016/0052130 | A1 | 2/2016 | Ekas | |
| 2016/0361814 | A1 | 12/2016 | Beevers | |
| 2017/0168565 | A1 * | 6/2017 | Cohen | A61B 5/0022 |
| 2018/0077976 | A1 * | 3/2018 | Keller | G06F 3/016 |
| 2018/0335841 | A1 * | 11/2018 | Rubin | G06F 3/016 |
| 2018/0335842 | A1 * | 11/2018 | Rubin | G06F 3/014 |
| 2019/0060099 | A1 * | 2/2019 | Ciocarlic | A61F 5/0118 |
| 2020/0121478 | A1 * | 4/2020 | Woge | B25J 9/1633 |

OTHER PUBLICATIONS

Mendoza, Hannah Rose, "3D Printed Assistive Device Created as a Journey in Self Acceptance, "3D Print.com, Sep. 2, 2015.

"Xtensor Hand Strengthener," Vitality Medical, <https://www.vitalitymedical.com/xtensor-hand-strengthener.html>.

Kira, "Man regains hand function thanks to 3D printed orthosis made from 70+parts,"Feb. 25, 2016.

Mendoza, Hannah Rose, "Spiderhand Device Addresses Mobility Disorders with 3D Printing,"3D Print.com, Jul. 27, 2015.

Dither, Myron A., et al. "RoboGlove—A Grasp Assist Device for Earth and Space", 45th International Conference on Environmental Systems, Published Jul. 12, 2015.

Xiloyannis, Michele, et al. "Modelling and design of a synergybased actuator for a tendondriven soft robotic glove." Biomedical Robotics and Biomechatronics (BioRob), 2016 6th IEEE International Conference, IEEE, 2016.

Turner, Michael Leo. "Programming dexterous manipulation by demonstration."Diss. Stanford University, 2001.

Polygerinos, Panagiotis, et al. "Soft robotic glove for combined assistance and at home rehabilitation."Robotics and Autonomous Systems 73 (2015): 135-143.

Ma, Zhou, Pinhas BenTzvi, and Jerome Danoff. "Hand Rehabilitation Learning System With an Exoskeleton Robotic Glove."IEEE Transaction on Neural Systems and Rehabilitation Engineering 24.12 (2016): 1323-1332.

* cited by examiner

GRASP ASSIST SYSTEM WITH TRIPLE BRUMMEL SOFT ANCHOR

CROSS-REFERENCE TO RELATED APPLICATIONS

This application claims priority to and the benefit of U.S. Provisional Application Ser. No. 62/482,658 filed on Apr. 6, 2017, and U.S. Provisional Application Ser. No. 62/529,831 filed on Jul. 7, 2017, the entire contents of which are hereby incorporated by reference.

STATEMENT REGARDING FEDERALLY SPONSORED RESEARCH OR DEVELOPMENT

The invention described herein was made by employees of the United States Government, and may be manufactured and used by or for the United States Government for governmental purposes without the payment of royalties thereon or therefor.

TECHNICAL FIELD

The present disclosure relates generally to a glove-based grasp assist system, and more particularly to a triple Brummel soft anchor for use in the system.

SUMMARY

A glove-based grasp assist system is disclosed herein. The system connects tendon actuators, e.g., motorized rotary ball screw assemblies, pulley systems, or other actuators, to glove fingers of a user-worn glove via flexible artificial tendons and flexible finger saddles. The finger saddles are sewn or otherwise secured to material of the glove. Each tendon is secured to end lobes of the finger saddles via a triple Brummel loop soft anchor connection. The present approach is intended to improve upon the performance of existing arcuate finger saddles or cylindrical phalange rings of the type engaged by a single, circumferentially-extending tendon loop, for instance as disclosed in U.S. Pat. No. 8,255,079 titled "Human Grasp Assist Device and Method of Use" and U.S. Pat. No. 9,067,325 titled "Human Grasp Assist Device of Goods", both of which are hereby incorporated reference in their entireties.

The finger saddles according to the present disclosure are specially configured to evenly distribute a tensile load from a respective flexible tendon acting on a particular phalange/finger segment, for instance the medial or distal phalanges of the users fingers. The triple Brummel configuration, when looped over and around the end lobes of the finger saddles, forms the soft anchor with two tendon anchor points. Such construction minimizes cinching or pinching in operation, which in turn helps avoid damage to the glove material and user discomfort. Additionally, use of the soft anchor facilitates in-place maintenance of the tendons, i.e., repair or replacement of the tendons without requiring the user to first remove the glove, with this capability improving overall operating efficiency.

The grasp assist system having the disclosed soft anchor may be used to selectively assist the natural grasping forces or other hand motions of a user. Power assist capabilities provided by one or more tendon actuators are selectively activated when the user executes a grasp maneuver, with the term "grasp maneuver" meaning a user-initiated, muscle-based motion of the user's hands involving the manual flexing of the user's fingers and/or thumb, regardless of whether the user grasps or otherwise makes contact with an external object during execution of the grasp maneuver. In other words, the user first decides when and bow far to move his or her fingers. The system then automatically assists in moving the user's fingers in response to such user-initiated motion. Exemplary hand maneuvers may include the grasping of a work tool or the mere flexing the user's empty hand against the natural resistance of the glove. The system configured as set forth herein may improve efficiency of work based or recreational applications, as well as rehabilitation of user's having limited finger movement strength, and dexterity.

A grasp assist system according to an example embodiment includes a glove, finger saddles, tendon actuators, and artificial tendons. The glove, which has multiple glove fingers, is configured to be worn on a hand of a human user. Each finger saddle is attached to a posterior surface of respective one of the glove fingers and includes a rectangular body partially circumscribing a respective one of the glove fingers. Additionally, each finger saddle includes a pair of end lobes disposed at opposite distal ends of the rectangular body. The tendons have a respective first end secured or otherwise connected to one of the tendon actuators and a second end defining a triple Brummel loop. The triple Brummel loop includes a pair of Brummel loops disposed around a respective one of the end lobes to form a soft anchor, with the soft anchor providing two tendon anchor points for a respective one of the tendons when the tendons are placed under tension by operation of the tendon actuators.

A shape of an outer perimeter of each of the finger saddles is a rounded, double-headed arrow in some configurations. A thickness of the end lobes may be at least double a thickness of the rectangular body.

The finger saddles are anisotropic, such that a bending strength of the end lobes exceeds a bending strength of the rectangular body in a first axial direction, and a bending strength of the rectangular body exceeds a bending strength of the end lobes in a second axial direction that is orthogonal to the first axial direction.

The finger saddles may be constructed of thermoplastic polyurethane-coated nylon.

The grasp assist system may also include a sensor and a controller in communication with the actuators and sensor. The controller may be configured, in response to feedback signals from the sensor, to selectively command application of the tension to one or more of the flexible tendons.

The sensor may include a flexion sensor configured to measure, as part of the feedback signals, a level of flexion of each of the glove fingers. The sensor may also include a set of contact sensors connected to the glove and configured to detect contact between the glove and an object as an additional part of the feedback signals.

The end lobes may define through holes, with the finger saddles sewn to the posterior surface of the glove fingers via the through holes.

A triple Brummel soft anchor is also disclosed for use in a grasp assist system having a tendon actuator and a glove configured to be worn on a hand of a user. The soft anchor may include a finger saddle configured to attach to a posterior surface of a glove finger of the glove, and having a rectangular body with a length sufficient for partially circumscribing the glove finger when the finger saddle is attached to the glove finger. The finger saddle in this embodiment defines a pair of end lobes at opposite distal ends of the rectangular body. A flexible artificial tendon has a first end forming a single loop of a size sufficient for connecting to the tendon actuator, and a second end defining a triple Brummel loop that includes a pair of Brummel loops disposed around a respective one of the end lobes and forming a soft anchor providing two anchor points on the finger saddle Additionally, a method is disclosed for connecting a flexible tendon to a glove finger in a grasp assist system having a tendon actuator and a glove configured to be worn on a hand of a human user. The method may include attaching a finger saddle to a posterior surface of a finger of the glove, the finger saddle having a rectangular body partially circumscribing the glove finger and defining a pair of end lobes at opposite distal ends of the rectangular body. The method also includes forming a triple Brummel loop at a first end of a length of artificial tendon, such that the triple Brummel loop defines a main Brummel loop and a pair of anchor Brummel loops. A second end of the artificial tendon is attached to the tendon actuator, with the method further including inserting the end lobes of the finger saddle into a respective one of the anchor Brummel loops such that the finger saddle forms a soft anchor with two tendon anchor points. Tension is then applied as part of the method to the flexible tendon, via a controller and the tendon actuator, at a level sufficient for tightening the pair of anchor Brummel loops or around the finger saddle.

The above summary is not intended to represent every embodiment or aspect of the present disclosure. Rather, the foregoing summary exemplifies certain novel aspects and features as set thrill herein. The above noted and other features and advantages of the present disclosure will be more easily understood from the following detailed description of representative embodiments and modes for carrying out the present disclosure when taken in connection with the accompanying drawings and the appended claims.

Figure 1:
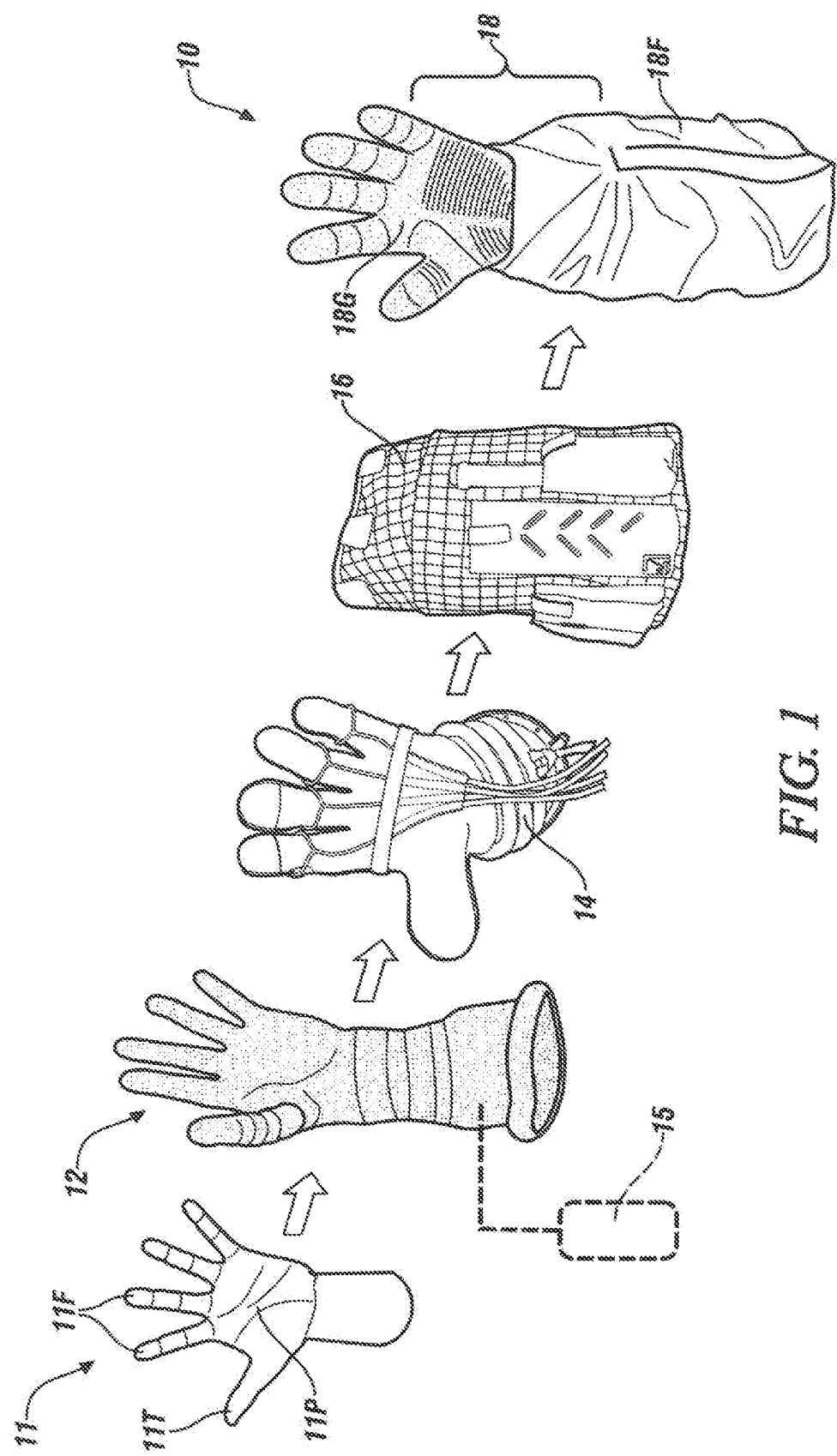
FIG. 1 is a schematic illustration of an example glove based grasp assist system as described herein.

The present disclosure is susceptible to modifications and alternative forms, with representative embodiments shown by way of example in the drawings and described in detail below. However, inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

With reference to the drawings, wherein like reference numbers refer to the same or similar components throughout the several views, an embodiment of a grasp assist system 10 as described herein is shown schematically in FIG. 1. The system 10, which is configured to be worn on either hand 11 of a human user although the illustration shows by non-limiting example the left hand), selectively assists the user in executing a grasp maneuver in which the user initiates movement of the user's fingers 11F and/or a thumb 11T. The system 10 described herein utilizes a Triple Brummel tendon configuration as part of a soft anchor transmitting tension to one or more fingers 11F and/or a thumb 11T of the hand 11, as will be described in further detail below with particular reference to FIGS. 7-8C.

The grasp assist system 10 shown in FIG. 1 may be connectable to and configured for use as part of a pressurized space suit (not shown) of the type used in aerospace operations. Non-aerospace applications may also be realized, such as manufacturing, construction, or medical rehabilitation, or recreational applications such as scuba diving, and therefore the space glove application described herein is merely illustrative of the general concepts of the various embodiments.

In the non-limiting example embodiment of FIG. 1, the grasp assist system 10 is a multi-layered glove having an optional inner bladder layer 12 worn on/immediately adjacent to the user's hand 11, an intermediate restraint layer 1 containing the drive improvements disclosed below, a hardware layer 16 containing one or more drivetrains 20 and a controller 50 (both depicted in FIGS. 2 and 3), and an optional protective outer layer 18. The outer layer 18 has a glove portion 18G and a forearm portion 18F, with the protective outer layer 18 configured for wear over the hardware layer 16. For the term "glove" will be used at times to refer generally to the combination of layers comprising the optional bladder layer 12, when used, the restraint layer 14, the hardware layer 16, and the glove portion 18G (when used).

With respect to the optional bladder layer 12, this flexible structure may be constructed of a suitable polymer or rubber material. In some embodiments, the bladder layer 12 may be connected to a pressure supply IS to pressurize the bladder payer 12. In the example of a space glove embodiment, for instance, the pressure supply 15 may be part of a pressurized space suit. In no-aerospace applications, the pressure supply 15 may be a pneumatic accumulator, i.e., a canister of compressed air or other suitable inert gas, or a scuba tank in an exemplary scuba application. Use of the pressure supply 15 may facilitate a built-in restorative force for gently returning the user's hand 11 to a relaxed "open" pose as a default position, as opposed to a "closed" or "grasping" position such as when the system 10 is assisting in the grasping of an object in the user's hand.

The restraint layer 14 functions by retaining shape of the bladder layer 12 to the fingers 11F, thumb 11T, and a palm 11P of the user's hand 11, as well as by protecting and insulating the user's hand 11. The restraint layer 14 may be equipped with portions of one or more drivetrain(s) 20 (see FIGS. 2 and 3) and other components that operatively connect to the user's fingers 11F and, possibly, the user's thumb 11T. The term "drivetrain", as used herein, comprises components shown in FIG. 2, starting from the actuator 22 to the finger saddle 28, i.e., actuator 22, conduit 24, tendon 25, palm bar 26, and saddle 28 for a given drivetrain 20. The restraint layer 14 may be optionally constructed of a suitable low-density, high-performance material. For instance, the restraint layer may be constructed of a polytrophic liquid crystal polymer, e.g., VECTRAN™.

Figure 2:
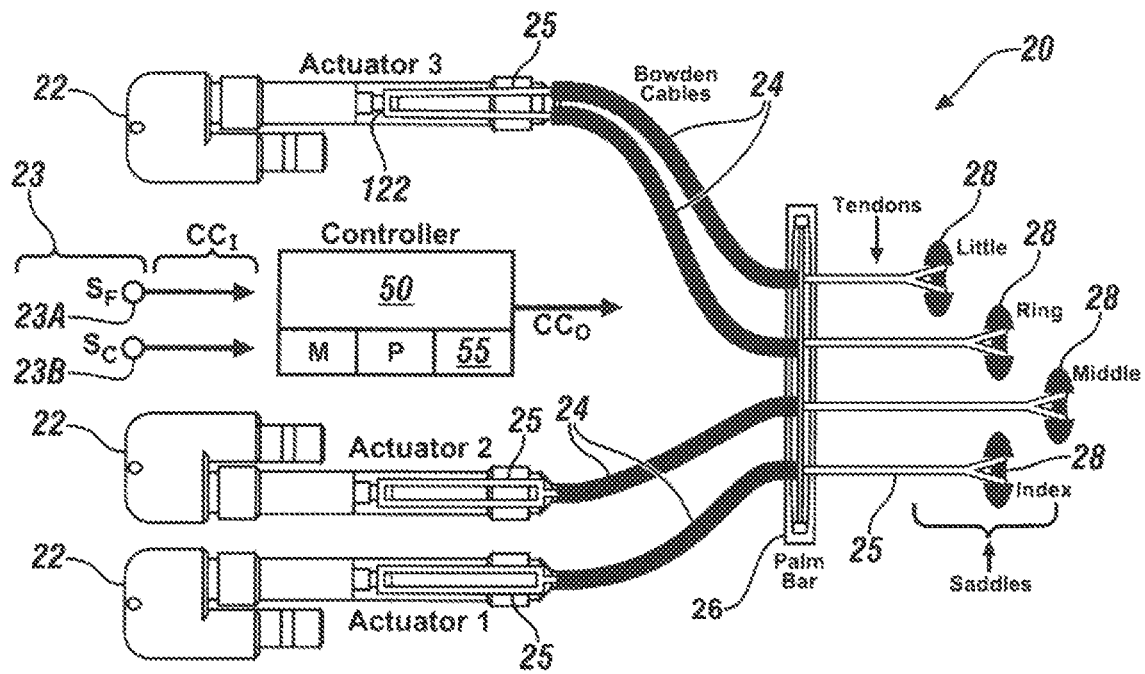
FIG. 2 is a schematic illustration of an example control configuration for the example glove shown in FIG. 1.
Figure 3:
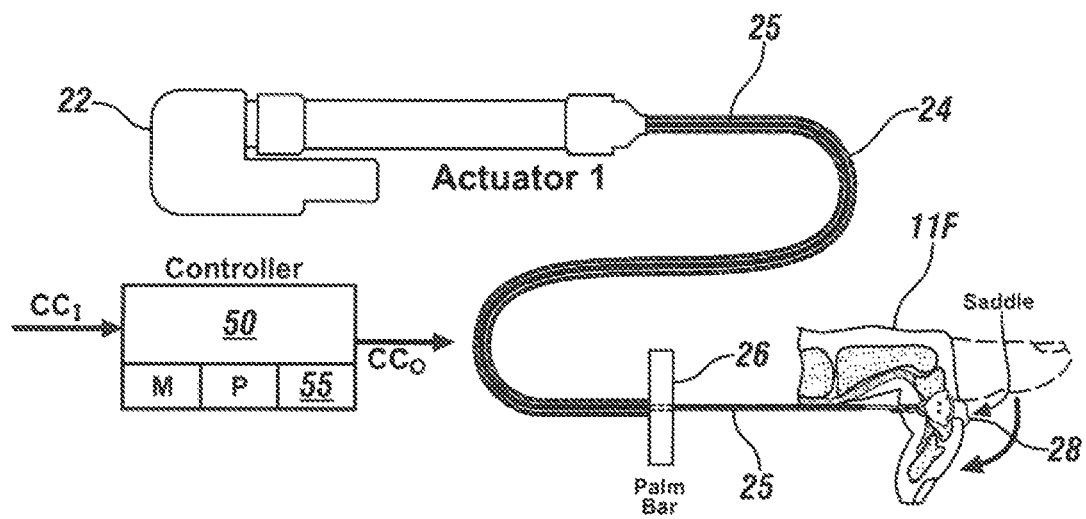
FIG. 3 is schematic illustration of an alternative single actuator control configuration.

The hardware layer 16 of FIG. 1, which may be worn on the user's wrist and forearm (not shown), contains the controller 50 and one or more tendon actuators 22 shown in FIGS. 2 and 3. For instance, the hardware layer 16 may be mounted on the posterior side of the user's forearm between the restraint layer 14 and the outer layer 18. The hardware layer 16 may in some embodiments be attached to the underside of the optional outer layer 18, such as via a hook-and-loop connection, magnetically, or using zippers, snap closures, or other application-suitable fasteners.

In some embodiments, the optional outer layer 18 wraps around, covers, and protects the restraint layer 14 and the hardware layer 16 from dust, debris, and other hazards. The glove portion 18O covers and protects the restraint layer 14, while the forearm portion 18F forms a protective wrap around the hardware layer 16. Suitable materials of construction of the outer layer 18, particularly the glove portion 18G, may include puncture-resistant/fiber-reinforced silicon rubber finger caps, e.g., KEVLAR™, a suitable flame-retardant fabric material, etc. The forearm portion 18F forms a gauntlet and may be constructed, e.g., or a reinforced biaxially-oriented polyethylene terephthalate (BoPET) material and polytetrafluoroethylene (PTFE) fabric. When the grasp assist system 10 is used in the embodiment of a space application noted above, the outer layer 18 may be embodied as a Thermal Micrometeoroid Garment (TMG) constructed of a blend of waterproof, impact resistant, and fire resistant fabrics, with similar or different materials used in other embodiments depending on the application.

FIG. 2 depicts one example of the drivetrain 20 noted above in a configuration that is suitable for use with the example grasp assist system 10 of FIG. 1. The controller 50 receives input signals (arrow $CC_1$) from a set of glove sensors 23, including one or more flexion sensors ($S_F$) 23A and a set of optional contact sensors ($S_C$) 23B. The contact sensors 23B may be embedded in the outer layer 18, e.g., on one or more phalanges of the glove portion 18G. Such locations provide strong grasp assistance when the contact sensors 23B detect external contact. The contact sensors 23B may be optionally embodied as load sensors or Force Sensitive Resistors (FSR), i.e., commercially-available flexible circuits made of conductive ink laminated between layers of plastic. The contact sensors 23B may be used to measure or detect contact with the fingers 11F or another portion of the glove when the user interacts with external objects or tools. The contact sensors 23B then report the detected contact to the controller 50, which may adjust tension on the tendons 25 in response to the reported contact.

In response to receipt of the input signals (arrow $CC_1$), the controller 50 calculates required tensile forces and then, via a set of control signals (arrow $CC_O$), drives a plurality of the tendon actuators 22, with the tendon actuators 22 also labeled Actuators 1, 2, and 3 for clarity in FIG. 2. The driven tendon actuators 22 apply the calculated tensile forces to a set of conduits 24, e.g., a Bowden cable, system in which a hollow outer conduit (made of stainless steel or other suitable material) is lined with PTFE or other suitable wear-resistant coating and contains a flexible tendon 25 located therein. Thus, the calculated tensile forces are automatically applied to some or all of the conduits 24 and tendons 25 in response to the input signals (arrow $CC_1$) from the love sensors 23.

The drivetrain 20 may be configured to drive a conventional full grasp, or to drive fewer fingers 11F of the hand 11 shown in FIG. 1, with or without driving the thumb 11T. Connected to the restraint layer 14, e.g., sewn into place, may be a plurality of finger saddles 28. Each finger saddle 28 partially circumscribes a phalange of a finger 11E of the operator's hand 11 (see FIG. 1) when the restraint layer 14 is worn on the hand by the user. Tensile forces are imparted to the drive tendons 25, which are operatively integrated within the accompanying conduits 24 and joined to the restraint layer 14 by a palm bar 26 as shown, thus indirectly acting on the user's fingers 11F/thumb 11T through the intervening finger saddles 28 when the restraint layer is worn. For added clarity, the finger saddles 28 are also labeled in FIG. 2 as "little", "ring", "middle", and "index" corresponding to the particular finger 11F of the operator's hand 11 depicted in FIG. 1.

Figure 7:
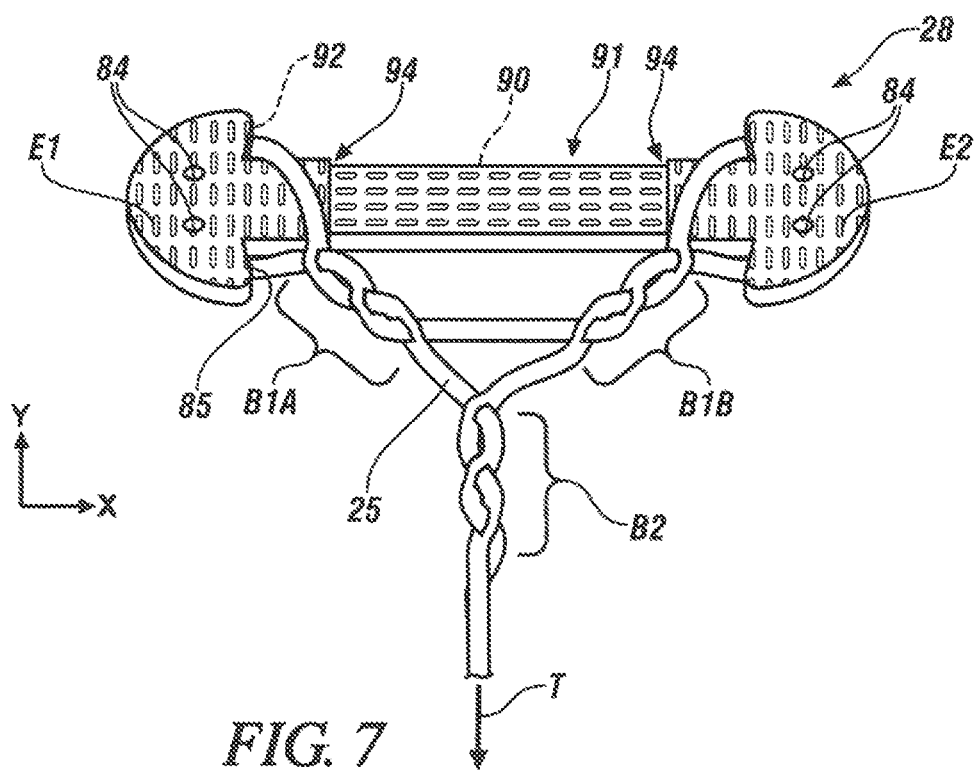
FIG. 7 is a schematic plan view illustration of a finger saddle and tendons forming a soft anchor connection usable with the glove-based grasp assist system described herein.
Figure 8A:
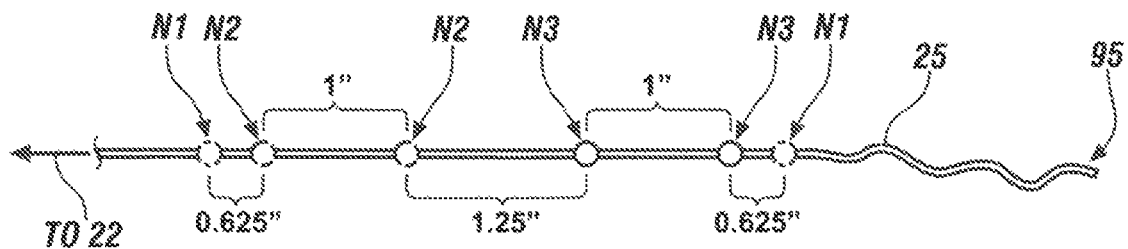
FIGS. 8A-C are schematic plan view illustrations of a length of artificial tendon describing a method of forming a triple Brummel loop for use with the saddle shown in FIG. 7.
Figure 8B:
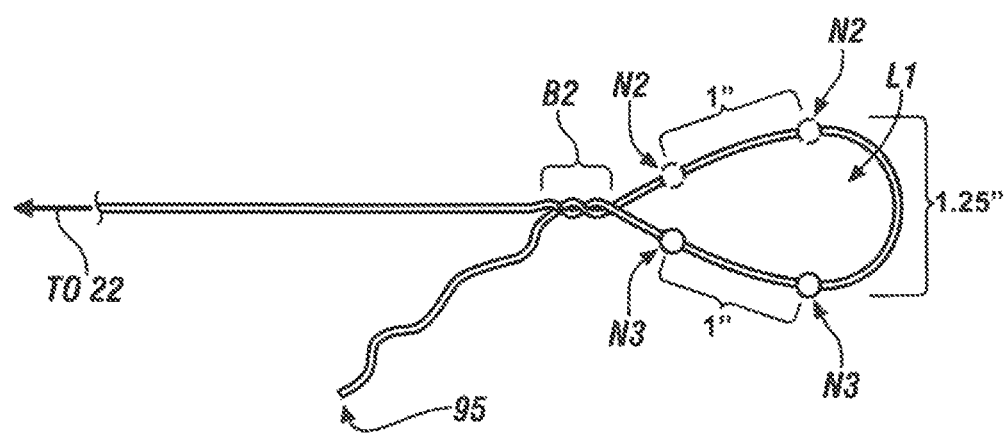
Figure 8C:
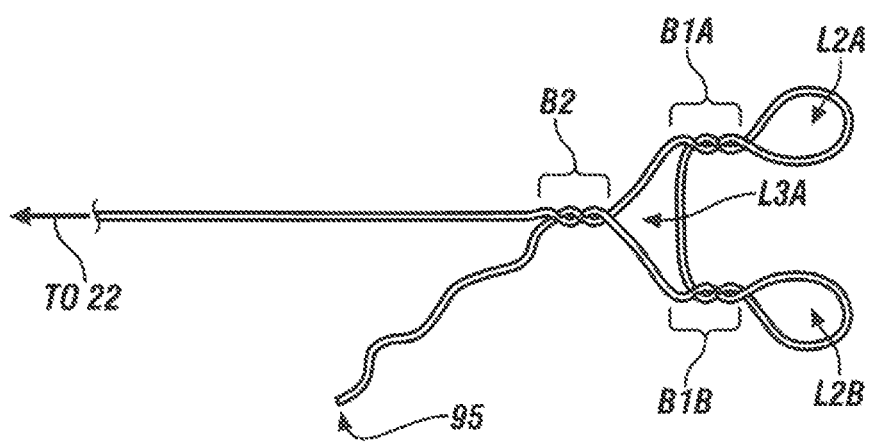

The finger saddles 28, described in greater detail below with reference to FIGS. 7-8C, are configured to smoothly distribute tensile/pulling forces generated by the tendon actuators 22. Such forces are transmitted along the tendons 25, e.g., across the posterior of the medial phalanges of the user's fingers 11F. In some embodiments, the finger saddles 28 may be constructed of thermoplastic polyurethane (TPU)-coated nylon straps that are laser cut to form a band having flared or lobed ends forming anchors that ultimately interface with the tendons 25. The individual finger saddles 28 are sufficiently flexible to enable the finger saddles 28 to gently contour around the user's fingers 11F whenever a mating tendon 25 is under tension. The tendons 25 themselves may be configured as a braid of multiple high-strength, wear-resistance fluorocarbon or other suitable materials, e.g., braided TEFLON™ and VECTRAN™ or other suitable fibers.

Three tendon actuators 22 are used with the tendons 25 in the illustrated example embodiment of FIG. 2. Each tendon 25 is secured to one of the tendon actuators 22 at one end of the tendon 25, e.g., via securing a single tendon loop to a tendon fastener or hook 122 or other retaining feature of the tendon actuator 22. At another end, the tendon 25 is secured to the finger saddles 28 via a triple Brummel loop connection to form a "soft anchor", i.e., components ultimately engaging and pulling on the user's fingers 11F of FIG. 1 are flexible or comfortably compliant under tension. The thumb 11T, the primary fingers (i.e., the index and middle fingers), and the secondary fingers (ring and little) 11F of the user's hand 11 (FIG. 1) may each have a dedicated tendon actuator 22, similar to the tendon actuator assembly as disclosed in U.S. Pat. No. 8,255,079 and noted above as being incorporated by reference in its entirety. FIG. 2 shows the index and middle fingers (11F) each having its own dedicated tendon actuator 22. Alternatively, the secondary fingers 11F, commonly referred to as the ring and little fingers, may be coupled to a single shared tendon actuator 22 as shown in FIG. 3. An example embodiment of a shared tendon actuator assembly is described in U.S. Pat. No. 9,149,933, which is likewise incorporated by reference in its entirety. Other actuators such as pulley systems or other types of solenoid drive systems may be used in lieu of the incorporated tendon actuators 22, without limitation, and therefore the tendon actuators 22 are not limited to rotary hall screw embodiments.

Referring now to the example single-actuator embodiment of FIG. 3, movement of a give finger 11F occurs when the tendon actuator 22 exerts a pulling force on the flexible tendon 25, which moves freely through a hollow outer conduit 24 and mounted palm bar 26, similar to operation of a bicycle brake using a Bowden cable system. This pulling force on the tendon 25 in turn transfers a mechanical pulling force on the operatively connected finger saddle 28. The outer conduit 24 may be constructed of a stainless steel conduit lined with an abrasion-free material such as PTFE. The conduit 24 of the Bowden cable system in such an embodiment possesses high strength in the axial direction while remaining flexible in all other directions, such that the conduit does not impede the user's wrist movements. Providing such a conduit also provides structural support between the tendon actuators 22 and the palm bar 26, thereby maintaining relative positioning of the palm bar 26 and the tendon actuators 22 as static under dynamic loading conditions.

In operation when the glove is worn, the tendon actuators 22 pull on and thus tension the tendons 25, with the tendons 25 routed through the hardware layer 16 of FIG. 1 to the restraint layer 14 through the conduits 24 anchored at the palm bar 26 and looping around the finger saddles 28 located on the medial joints of the user's fingers 11F when the glove is worn. As the tendon actuator 22 pulls the tendon(s) 25, the user's finger 11F is guided into a flexed position as shown in FIG. 3. The user may provide an extension three to open his or her hand in one embodiment.

In another embodiment, the extension force or "restorative" force is automatically implemented when the controller 50 determines that the user's grasp is being released. One possible approach for providing the restorative force is use of the pressurized bladder layer 12 and the external pressure supply 15 shown schematically in FIG. 1, or using mechanical springs embedded in the glove portion 18G or other parts of the glove. The restraint layer 14 becomes a semi-rigid body when the bladder layer 12 is pressurized. When the users grip releases and transitions to a relaxed state, interposition of the pressurized bladder layer 12 between the hand 11 and the restraint layer 14 passively returns the pulling tendons 25 into a relaxed/non-grasping pose.

Figure 4:
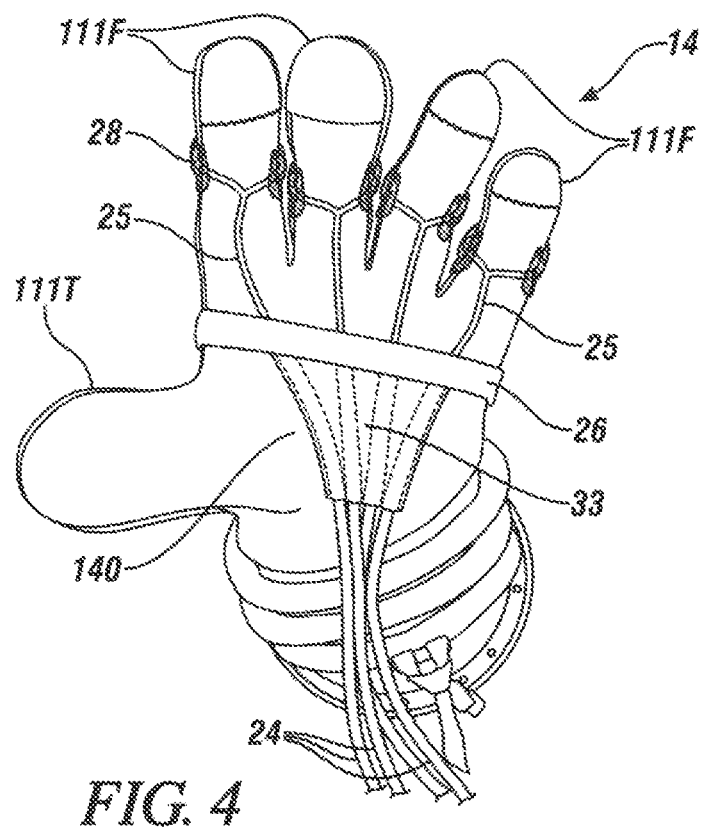
FIG. 4 is a more detailed perspective view illustration on the palm side of a restraint layer to a grasp assist system of FIG. 1.
Figure 5:
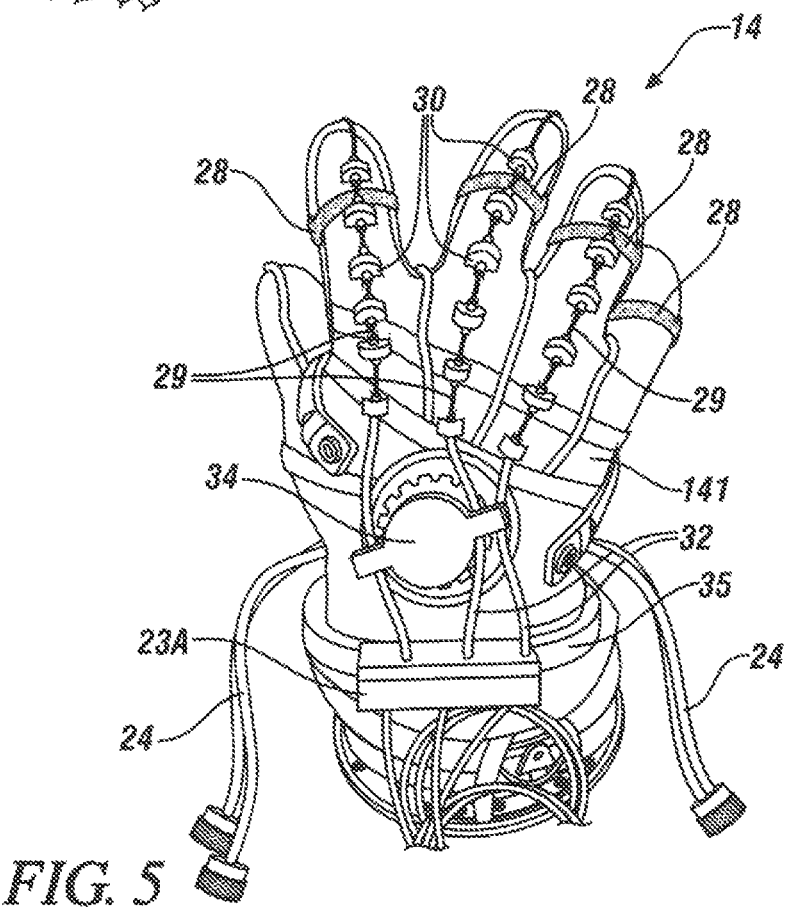
FIG. 5 is a more detailed perspective view illustration from the back of a user's right hand of an example restraint layer of a glove in accordance with one or more embodiments described herein.

FIG. 4 is a more detailed perspective view illustration of the respective palm-side 140 of the restraint layer 14 shown in FIG. 1, with glove fingers 111F and a glove thumb 111T shown for example left-handed glove. FIG. 5 is a more detailed perspective view illustration of the grasp assist system 10 from the posterior or back side of the user's right hand in accordance with a right-banded glove system described herein. Depicted in these views are the finger saddles 28, the conduits 24, and the palm bar 26 noted above with reference to FIG. 2. Wherever motion of the tendon actuators 22 or other components of the grasp assist system 10 could potentially rub on or abrade contact areas of the restraint layer 14 due to relative motion, such contact areas may be shielded with reinforced patches of PTFE fabric or other suitable wear-resistant materials. The tendons 25 connect to the ends of the finger saddles 28 using the triple Brummel loop connection depicted in FIGS. 7-8C.

Referring now to FIG. 5, this view depicts possible placement of sensor cable restraints 30, sensor conduits 32, and the flexion sensor(s) 23A on the restraint layer 14. The flexion sensors 23A may be optionally embodied as string potentiometers 29 as shown, or as motion capture devices, bend sensors, joint angle sensors, or other suitable sensors, and used to track, finger flexion and a resultant change in relative position and attitude (e.g., pitch, yaw, roll) in free space of each phalange of the user's fingers 11F. The sensor cable restraints 30 may be segmented and spaced apart as shown, with a plurality of sensor cable restraints 30 used per finger of the restraint layer 14. The flexion sensor 23A, which may be optionally embodied string potentiometers 29 as shown, are used to track the position and/or attitude (e.g., pitch, yaw, and roll) in free space of each phalange of the user's fingers 11F (see FIGS. 1 and 3), and to thereby allow the controller 50 to determine motion and relative position of each of the fingers 11F and, when used, the thumb 11T. To avoid adversely affecting durability of the bladder layer 12, the flexion sensors 23A may be integrated outside of the restraint layer 14 as shown, such as by using a fabric-tape addition on the outside of the restraint layer 14. Depending on the selected operating mode, as the user's fingers flex, the tendon actuators 22 of FIGS. 2 and 3 may respond with synchronized grasp assistance, thereby offering intuitive operation of the grasp assist system 10.

In general, the flexion sensors 23A may be used to determine flexion of the phalanges for the user's index, middle, and ring fingers 11F. Such sensors 23A may be placed on the posterior of the user's hand 11 as shown in FIG. 5 and mounted on the restraint layer 14. The flexion sensors 23A may be mounted on a custom plate attached to a stainless steel wrist cuff 35, e.g., in the above-noted space glove embodiment. When string potentiometers are used for the flexion sensors 23A, sensor strings 29 (FIG. 5) route along the posterior side 141 of the restraint layer 14, around a ratchet mechanism 34 used to selectively adjust the fit of the restraint layer 14, through a PTFE-lined conduit 32, up the fingers 11F through the segmented sensor cable restraints 30, and link to a fabric seam located at the tip of the distal phalanges as shown.

The palm bar 26, shown in part in FIG. 4, serves as a sturdy anchor for the conduits 24, which are routed into the palm bar 26 via a conduit manifold 33. In this manner, the palm bar 26 ensures that structural components of the retaining layer 14 are securely fitted to the user's hand 11. The palm bar 26 may be configured with application-suitable fit and curvature, e.g., for a Phase VI space suit glove as manufactured by ILC DOVER, LP, of Frederica, Del., modified to include passageways for the tendons 25 and conduits 24.

The flexible conduit manifold 33 may be constructed of fabric or other suitable textile and is used to concentrate and attach the conduits 24 to the palm-side 140, adjacent to the palm bar 26, of the restraint layer 14. As noted above, each tendon 25 is contained within a respective conduit 24 to form the operative cable tension system, e.g., a Bowden cable system, with the conduits 24 received within the manifold 33. The tendons 25 emerge from the palm bar 26 and extend along and/or about the fingers of the restraint layer 14 with operable connection to each respective saddle 28 as will be described with further detail below. In some embodiments, the palm bar 26 may be constructed of 316 SS (Stainless Steel), for instance, using a direct metal laser sintering process, and integrated with the ratchet mechanism 34 located on the posterior 141 as shown in FIG. 5, so that the palm bar 26 is adjustable during use. The palm bar 26 thus acts an anchor or ground for the conduits 24, and thus is configured to withstand force loads in excess of loads experienced by a typical space suit palm bar.

Figure 6A:
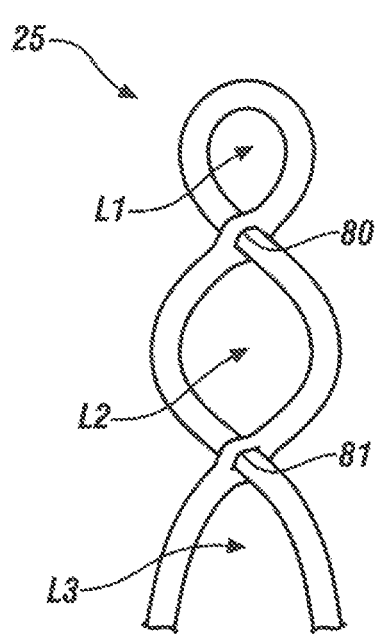
FIGS. 6A and 6B are prior art schematic plan view illustrations of an example single tendon mop configuration for use with a phalange ring.
Figure 6B:
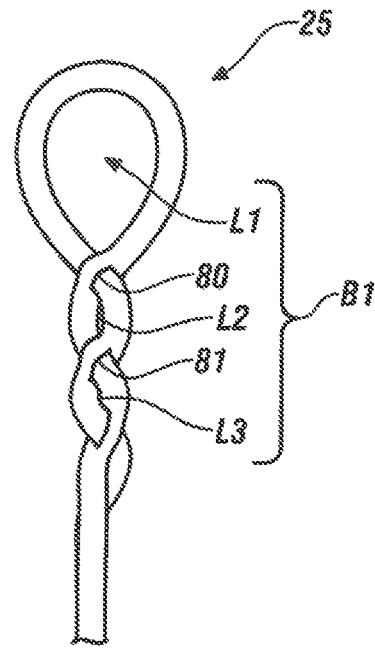

Referring briefly to FIGS. 6A and 6B, a single loop in the form of a Brummel eye splice may be used to connect an artificial tendon to a cylindrical structure serving the function of a fastener. One such approach is disclosed in the above-noted incorporated reference U.S. Pat. No. 9,067,325. A braided tendon 25 may be configured as shown in FIG. 6A so as to define three loop regions L1, L2, and L3. Eye slots 80 and 81 may then be formed in the braided tendon 25. The tendon 25 is then fed through the eye slots 80 and 81 as shown to create and then remove a twist in the braided tendon. The resulting Brummel loop to (or "splice") L1, when the tendon 25 is placed under tension, ultimately cinches down upon itself in a manner similar, to a Chinese finger trap. Friction from this connection cancels out the longitudinal force of tension on the tendon 25, and the resultant braid B1 of the tendon 25 in the area of loop regions L2 and L3 of FIG. 6B distributes a load across an area to avoid stress concentrations.

While such a single loop configuration is usable in embodiments employing a rectangular or cylindrical finger saddle, i.e., by wrapping the Brummel loop L1 circumferentially around and onto such a saddle or phalange ring, and thus around the phalange of a user's finger 11F (FIG. 1) so that the tendon 25 pulls directly on the posterior of the user's finer 11F, the approach of FIGS. 6A and 6B may be sub-optimal for certain applications and purposes, including long-term durability and user comfort.

With reference to FIG. 7, the finger saddle 28 may be sewn into place in the material of the restraint layer 14 of FIGS. 1, 4, and 5, e.g., via a plurality of through-holes 84. Each saddle 28 has an elongated rectangular body 91 that flares or widens into end lobes E1 and E2. That is, the finer saddle 28 has an outer perimeter (in plan view) in the shape of a rounded, double-headed arrow as shown, or other shape suitable for anchoring the tendons 25 at two opposing anchor points of the finger saddles 28. The end lobes E1 and E2 may define the through-holes 84 as shown, and/or other points may be used to connect the finger saddle 28 to a posterior of the glove fingers as shown in FIG. 5.

More specifically, rather than looping the tendon 25 circumferentially around the user's finger 11F (FIG. 1), the end lobes E1 and E2 form an anchor with two different and opposite tendon anchor points for securing the tendon 25. This construction, when coupled with the triple Brummel configuration set forth below with reference to FIGS. 8A-C, enables smooth distribution of pulling forces along the lateral sides of the user's finger 11F (FIG. 1), as opposed to pulling equally around the circumference of the users finger 11F.

The end lobes E1 and E2, which define side walls 85 extending generally parallel to an axis of the user's finger 11F, have a thickness that exceeds a thickness of the rectangular body 91, by a factor of two or more, i.e., at least double-thickness. A small shoulder 94 may be formed in the end lobes E1 and E1. Using the triple Brummel soft anchor for the construction of the tendon 25, the tendon 25 may be looped over and around the end lobes E1 and E2 as shown, such that the tendon 25 is positioned adjacent to the side walls 85. Tension applied by the tendon actuators 22 of FIGS. 2 and 3 in the direction of arrow T ultimately tightens braids B1A, B1B, and B2, which in turn are formed via splicing of the tendon 25 as shown.

The finger saddle 28 used as part of the grasp assist system 10 is anisotropic, a property represented by orthogonal bending strength grain lines 90 and 92 indicating different bending strengths in the width (X) and length (Y) axes of the finger saddle 28. That is, a bending strength of the end lobes E1 and E2 exceeds a bending strength of the rectangular body 91 in a first axial direction, and a bending strength of the rectangular body 91 exceeds a bending strength of the end lobes E1 and E3 in a second axial direction that is orthogonal to the first axial direction, e.g., the N and Y axes. Grain lines 92 represent that the end lobes E1 and E2 are configured to withstand tensile forces from the tendon 25, and grain lines 90 indicate that the axial portion 91 freely and evenly flexes when the tendon 25 is tensioned by the tendon actuators 22.

FIGS. 8A 8B, and 8C collectively describe an embodiment of a method for forming a triple Brummel soft anchor connection usable as part of the grasp assist system 10 of FIG. 1 or another system employing the finger saddles 28 described above. A length of tendon 25 may be arranged lengthwise on a surface, with an end 95 of the tendon 25 shown to the right from the perspective of FIG. 8A. Node pairs N1, N2, and N3 represent points along a length of the tendon 25 that form holes or eye slots, e.g., formed by splitting through the tendon 25. The node pairs N1, N2, N3, which are configured such that the the braided tendon 25 passes therethrough, ultimately match up with each other through the processes of forming the triple Brummel loop disclosed herein.

Example inter-nodal distances, from left-to-right, are 0.625" (inches) between the first node of node pair N1 and the first node of node pair N2, 1" between the two nodes forming the node pair N2, 1.25" between the second node of node pair N2 and the first node of node pair N3, 1" between the nodes forming the node pair N3, and 0.625" between the second node of node pair N3 and the second node of node pair N1. Different distances may be used in other embodiments, with the depicted example distances being illustrative of node spacing resulting in a loop size usable with the finger saddle 28 of FIG. 7.

In FIG. 8B, the end 95 of the tendon 25 of FIG. 8A is arranged in a first tendon loop L1 with nodes of the node pairs N2 and N3 disposed on opposite sides of the first tendon loop L1. The portion of tendon 25 located proximate the nodes of node pair N1, in this stage of forming the triple Brummel loop configuration, are spliced, woven, or otherwise braided together using a Brummel splice or loop technique to form the braid B2.

FIG. 8C shows completion of the process by forming two additional "Brummel" loops L2A and L2B. Nodes of the node pair N2 of FIG. 8B are spliced, woven, or otherwise looped together to form the braid B1A. Similarly, inter-nodal lengths of the tendon 25 defining nodes of node pair N3 in FIG. 8B are spliced, woven, or otherwise looped together to form braid B1B. Formation of smaller anchor Brummel loops L2A and L2B out of the larger loop L1 shown in FIG. 8B effectively forms a third/main Brummel loop L3A. Thus, in accordance with the method described herein, the three loops of the disclosed triple Brummel loop configuration are the Brummel loops L2A, L2B, and L3A.

An alternative embodiment for forming the above-described triple Brummel soft anchor connection entails creating the braids B1A and B1B prior to forming the braid B2. That is, braid 1A of FIGS. 8B and 8C may be formed by sowing end 95 of the tendon 25 at the node pair N2 to thereby form loop L2A. End 95 is then sown at node pair N3 to form braid B1B, with this process resulting in formation of loop L2B. Braid B2 is then formed to provide loop L3A. Other approaches or sequences may be envisioned within the scope of the disclosure, and therefore the embodiments described with reference to FIGS. 8A, 8B, and 8C are exemplary of the present teachings and non limiting.

Referring again to FIG. 7, the Brummel loops L2A and L2B when formed according to the process depicted in FIGS. 8A-8C are wrapped loosely around the lobed ends E1 and E2 of the finger saddle 28. The distal end of the tendon 25 connects to a translatable portion of the tendon actuators 22 as shown in FIGS. 2 and 3, e.g., to the tendon fastener 122. Tension (arrow T) applied to the tendon 25 by the tendon actuators 22 tightens the braids B1A and B1B so that the Brummel loops L2A and L2B close and tighten around the rectangular body 91 immediately adjacent to the lobed ends E1 and E2. The Brummel loop L3A of FIG. 8C closes in response to the applied tension (arrow T). Releasing the tension (arrow T) loosens the Brummel loops L2A, L2B, and L3A of FIG. 8C. Thus, unlike designs in which a single looped end of the tendon 25 circumscribe the user's finger, extend all the way around a lengthwise axis of the finger saddle 28, the configuration of FIG. 7 enables the tendon 25 to be replaced or repaired as needed without having to remove die glove from the user's hand 11 (see FIG. 1).

As noted above with reference to FIGS. 6A and 6B, placing the tendon 25 under tension ultimately cinches the various braids B2, B1A, and B1B of the tendon 25 in a manner similar to a Chinese finger trap. The tendon 25 in proximity to the end 25 experiences high friction under such tension. The cinching action distributes stress concentration to allow forces acting on the braids B2, B1, and B1B to cancel out. Thus, tension toward the tendon actuators 22 tightens the braids B2, B1, and B2 while tension applied to end 95 has the opposite effect. Symmetry of construction of the braids B1A and B1B may be relied on to help cancel lateral tension forces between braids B1A and B1B.

As will be understood from the forgoing disclosure, a method of connecting the flexible tendon 25 to a glove finger in the grasp assist system 10 of FIG. 1 includes attaching the finger saddle 28 of FIG. 7 to a posterior surface of a finger of the glove, as shown in FIG. 5, e.g., via sewing. The method may include forming a triple Brummel loop at or near a first end 95 of a given one of the tendons 25, i.e., the end 95 of FIG. 8A, such that the triple Brummel loop is funned defining a main Brummel loop (loop L3A) and a pair of anchor Brummel loops L2A and L2B, all of which are shown in FIG. 8C.

A second end of the artificial tendon 25 is connected to the tendon actuator 22 shown in FIG. 2 or 3. The end lobes E1 and E2 of the finger saddle 28 shown in FIG. 7 are then inserted into a respective one of the anchor Brummel loops L2A and L2B such that the finger saddle 28 forms a soft anchor with two tendon anchor points as noted above. The method thereafter includes applying tension to the tendon 25, via use of the controller 50 and the tendon actuator 22 of FIGS. 2 and 3, at a level sufficient for tightening the pair of anchor Brummel loops L2A and L2B on or around the finger saddle 28.

While some of the best modes and other embodiments have been described in detail, various alternative designs and embodiments exist for practicing the present teachings defined in the appended claims. Those skilled in the art, now having benefit of this disclosure, will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined by the claims appended hereto.

The invention claimed is:

1. A triple Brummel soft anchor for use in a grasp assist system having a tendon actuator and a glove configured to be worn on a hand of a user, the triple Brummel soft anchor comprising:
    a finger saddle configured to attach to a posterior surface of a glove finger of the glove, and having a rectangular body with a length sufficient for partially circumscribing the glove finger when the finger saddle is attached to the glove finger, the finger saddle defining a pair of end lobes at opposite distal ends of the rectangular body; and
    a flexible artificial tendon having a first portion forming a single loop of a size sufficient for connecting to the tendon actuator, and at least one end defining a triple Brummel loop that includes a pair of Brummel loops, each one of said pair of Brummel loops being disposed around a respective one of the pair of end lobes and combining with the finger saddle to form a soft anchor providing two anchor points on the finger saddle, thereby enabling distribution of pulling forces along the lateral sides of the glove finger.

2. The soft anchor of claim 1, wherein a shape of an outer perimeter of the finger saddles is a rounded, double-headed arrow.

3. The soft anchor of claim 2, wherein a thickness of the end lobes is at least double a thickness of the rectangular body.

4. The soft anchor of claim 1, wherein the finger saddle is anisotropic such that a bending strength of the end lobes exceeds a bending strength of the rectangular body in a first axial direction, and a bending strength of the rectangular body exceeds a bending strength of the end lobes in a second axial direction that is orthogonal to the first axial direction.

5. The soft anchor of claim 1, wherein the finger saddle is constructed of thermoplastic polyurethane-coated nylon.

* * * * *